US007724788B2

(12) United States Patent  (10) Patent No.: US 7,724,788 B2
Richter  (45) Date of Patent: May 25, 2010

(54) WAVELENGTH-AGILE LASER TRANSMITTER USING OPTICAL PARAMETRIC OSCILLATOR

(75) Inventor: Dale A. Richter, Sandia Park, NM (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 287 days.

(21) Appl. No.: 12/055,385

(22) Filed: Mar. 26, 2008

(65) Prior Publication Data

US 2009/0245297 A1    Oct. 1, 2009

(51) Int. Cl.
*H01S 3/10*    (2006.01)
(52) U.S. Cl. ......................................... 372/21
(58) Field of Classification Search ............. 372/21, 372/22
See application file for complete search history.

(56) References Cited

U.S. PATENT DOCUMENTS 6,016,214 A   1/2000 Meyer, Jr. et al.
6,044,094 A * 3/2000 Govorkov ..................... 372/21
6,751,010 B1 * 6/2004 Richter ....................... 359/330

* cited by examiner

*Primary Examiner*—Minsun Harvey
*Assistant Examiner*—Patrick Stafford
(74) *Attorney, Agent, or Firm*—Edell, Shapiro & Finnan, LLC

(57) ABSTRACT

A wavelength-agile laser transmitter apparatus and method are provided. The apparatus comprises a pump laser that is configured to output a pump beam at a first (pump) wavelength and an optical parametric oscillator. The optical parametric oscillator comprises a cavity that contains several optical components including a non-linear optical medium, a first, second and third optical elements, and a narrow linewidth filter. The non-linear optical medium is configured to convert light at the first wavelength to light at a second (signal) wavelength and a third (idler) wavelength that are each longer than the first wavelength. Light at the second and third wavelengths is allowed to partially resonate in the optical parametric oscillator, and the output beam of the apparatus corresponds to light at the third wavelength.

25 Claims, 4 Drawing Sheets

WAVELENGTH-AGILE LASER TRANSMITTER USING OPTICAL PARAMETRIC OSCILLATOR

FIELD OF THE INVENTION

The present invention relates to optical parametric oscillators, and more particularly to a wavelength-agile laser transmitter using an optical parametric oscillator.

BACKGROUND OF THE INVENTION

Optical parametric oscillators are well-known, non-linear optical devices capable of producing coherent radiation at a desired frequency via parametric amplification. In a conventional optical parametric oscillator (OPO), a pump source supplies a beam of laser light at a pump wavelength to an optical cavity bounded by end mirrors and containing a non-linear optical medium such as a non-linear optical crystal. As the pump beam propagates through the non-linear crystal within the cavity, photons at the pump wavelength are converted into photon pairs at two longer wavelengths, resulting in two lower-energy beams at these two wavelengths, conventionally called the signal wavelength and the idler wavelength. The sum of the frequencies of the signal and idler beams equals the frequency of the pump beam. The particular wavelengths of the signal and idler beams are determined by a number of factors, including: the pump wavelength, the type and cut of the non-linear crystal, and the design of the optical cavity. In addition, by adjusting the angle of the non-linear crystal, tuning of the signal wavelength and idler wavelength beams can be achieved.

Since typical operating conditions cause only a small fraction of the pump beam to be converted to the signal and idler beams in the initial pass through the non-linear optical crystal, the optical cavity of the OPO is generally designed to oscillate one or both of the parametrically generated beams such that the signal and/or idler beam is amplified in successive passes through the non-linear optical crystal. The OPO is considered a doubly resonant oscillator when both of the generated optical beams are resonated and is considered a singly resonant oscillator when only one of the generated optical beams is resonated. Specifically, the optical cavity can be designed with end mirrors which reflect only one of the signal and idler frequencies (singly resonant) or with end mirrors which reflect both the signal and idler frequencies (doubly resonant).

One application of an OPO is a light source for detection and/or identification of chemical/biological gases. Chemical or biological agents with narrow linewidths require laser linewidths a small fraction of their absorption features for accurate measurements, while other agents with broad features require multiple laser lines and linewidths consistent with atmospheric transmission windows. Thus, an OPO for such applications needs to have a tuning range of multiple (10 or more) wavelengths, be continuously tunable over this range and be capable of operating at a high repetition rate to allow for signal averaging measurements. Moreover, it is desirable to provide and OPO with a high frequency tuning rate for short collection times of data and quick assessment of a sampled region. Finally, the OPO should be relatively light and compact so that it can be deployed on a variety of platforms, including air and land vehicles.

SUMMARY OF THE INVENTION

Briefly, a wavelength-agile laser transmitter apparatus and method are provided. The apparatus comprises a pump laser that is configured to output a pump beam at a first (pump) wavelength and an optical parametric oscillator. The optical parametric oscillator (OPO) comprises a cavity that contains several optical components including a non-linear optical medium, a first, second and third optical elements, and a narrow linewidth filter. The non-linear optical medium is configured to convert light at the first wavelength to light at a second (signal) wavelength and a third (idler) wavelength that are each longer than the first wavelength. The angle of the non-linear optical medium relative to the propagation axis of the optical parametric oscillator is adjustable to effectively tune the second and third wavelengths in the OPO. The first optical element is configured to receive the pump beam and direct it into a first end of the non-linear optical medium. The first optical element is configured to be highly reflective at the second wavelength and highly transmissive at the third wavelength. The second optical element is positioned proximate a second end of the non-linear optical medium and is configured to be highly reflective at the first and second wavelengths and highly transmissive at the third wavelength. The narrow linewidth filter, e.g., an etalon, is positioned in proximate the first optical element and is configured to narrow a linewidth of light that passes through it. The third optical element is positioned proximate the etalon and is configured to be highly reflective at the third wavelength such that light at the third wavelength resonates between the etalon and the third optical element and passes through the first optical element into the non-linear optical medium where it interacts with light at the second wavelength. The output beam of the apparatus corresponds to light that is transmitted through the second optical element at the third wavelength.

A galvanometer is provided for each of the first and second non-linear optical crystals and for the etalon filter. The galvanometers change the angles of the respective first and second non-linear optical crystals and of the etalon filter relative to the propagation axis of the optical cavity and in so doing adjust the third wavelength of light.

Other objects and advantages will become more readily apparent when reference is made to the following description taken in conjunction with the accompanying drawings.

DETAILED DESCRIPTION

Figure 1:
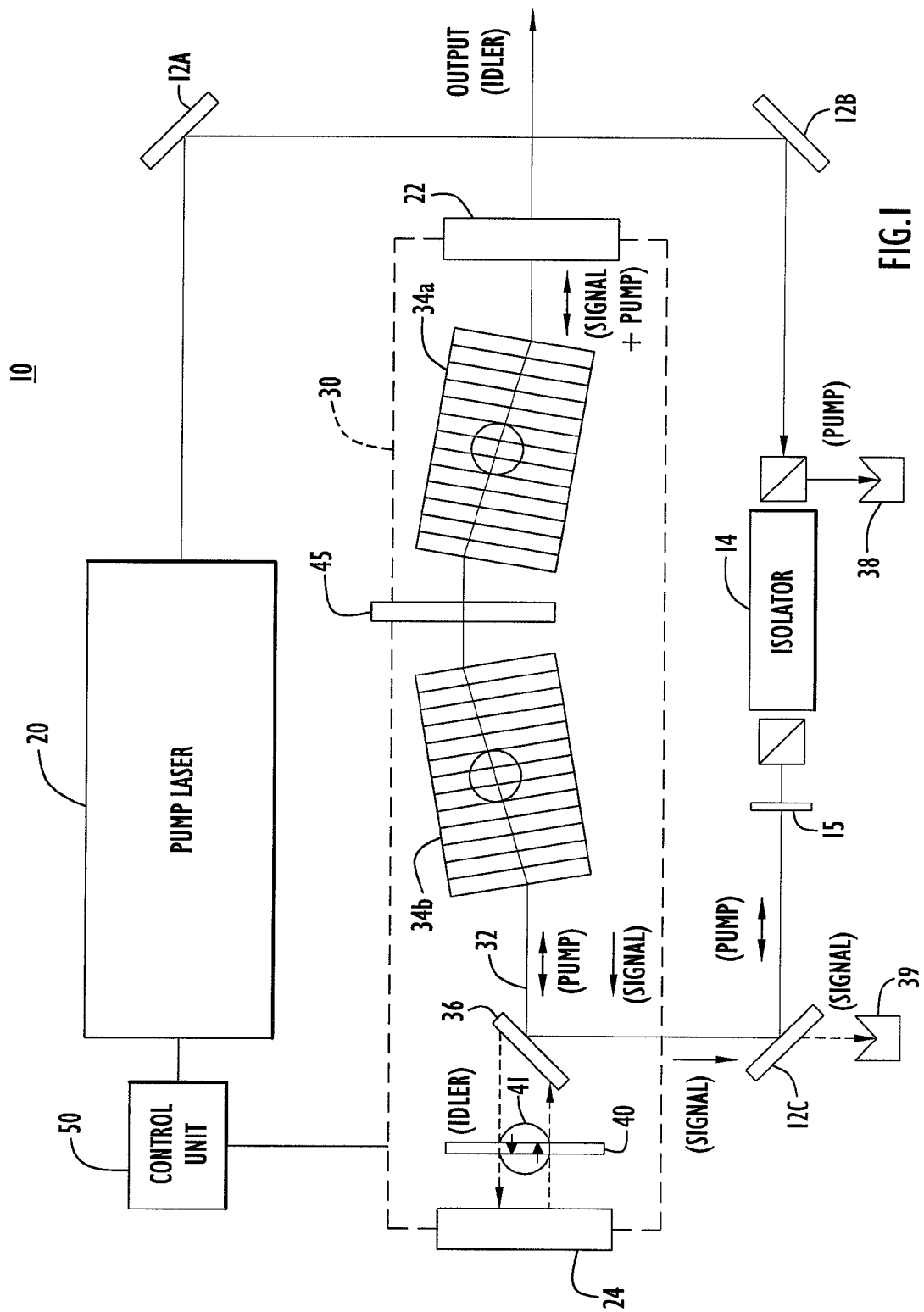
FIG. 1 is a block diagram of the wavelength-agile optical parameter oscillator.

Referring first to FIG. 1, the wavelength-agile laser transmitter is generally shown at reference numeral 10. The wavelength agile laser transmitter 10 comprises a single longitudinal mode (SLM) pump laser 20, turning mirrors 12A, 12B and 12Ca, an isolator 14 and an optical parameter oscillator (OPO) 30 comprising several additional components. The OPO 30 comprises an enclosed cavity in which these additional components are positioned. There is also a waveplate 15 on the downstream side of the isolator 14 before the turning mirror 12C.

As an example of one application, the wavelength agile laser transmitter 10 is useful for wavelength conversion to mid-wavelength infrared (MWIR) laser lines, and is particularly desirable for systems requiring rapid tuning between different wavelengths for detection and identification of chemical and biological substances. For example, chemical or biological substances with narrow spectral linewidths require laser line widths $1/10^{th}$ of their absorption features for accurate measurements while substances agents with broad features require multiple laser lines and linewidths consistent with atmospheric transmission windows.

Accordingly, inside the OPO 30 of the transmitter 10 there is a non-linear optical medium comprised of a pair of non-linear optical crystals 34a and 34b, each of which whose angle with respect to a propagation axis 32 in the OPO 30 can be adjusted. A pump mirror 36 in the OPO 30 directs the pump beam to the non-linear optical medium, to the right as shown in FIG. 1. On the opposite side of the crystal 34b at the output end (right-hand end) of the OPO 30 is an output coupler 22 that serves to pass the output light at a desired wavelength but to reflect other wavelengths of light back through the non-linear optical medium as described herein. The function of the non-linear optical crystals 34a and 34b is to convert light at the first wavelength to light at the second and third wavelengths, and an angle of each of the crystals relative to the propagation axis 32 is adjusted to control apportionment of energy converted into light at the second and third wavelengths. At the opposite end (left-hand end) of the OPO 30 is a rear mirror 24 and a narrow wavelength adjustable filter or etalon 40 between the rear mirror 24 and the pump mirror 36. There is an optional filter 45 positioned between the non-linear optical crystals 34a and 34b. Additional components of the laser transmitter 10 include optical dump elements 38 and 39.

A control unit 50 controls the operation of the pump laser 20 and the various optical elements, particularly the angle-tuned non-linear optical crystals 34a and 34b and the etalon 40. The control unit 50 may be similar to a laptop computer that is programmable with parameters to control these elements to achieve the desired tuned wavelength output, repetition rate and scanning across the tunable range of the OPO 10.

The pump laser 20 outputs light at a fixed wavelength called a pump wavelength, referred to herein as the first wavelength. It may be a relatively narrow linewidth pump laser, such as an SLM Nd:YAG pump laser having up to a 2 kHz repetition rate.

The pump laser 10 outputs pulses of light into the OPO 30, where the non-linear optical crystals 34a and 34b convert the pulses of light at the pump wavelength to beams of light at so-called signal wavelength and idler wavelength. The signal wavelength is also referred to as the second wavelength and the idler wavelength is referred to as the third wavelength. In one embodiment, the OPO 30 is designed to create oscillations at the idler wavelength, such that the desired output wavelength is at the idler wavelength. However, it may be designed to oscillate at the signal wavelength. The angles of the non-linear optical crystals 34a and 34b relative to a propagation axis 32 of the OPO 30 are adjusted to control the signal wavelength and idler wavelength. Moreover, the angle of the etalon 40 relative to the propagation axis is adjustable to select a very narrow linewidth of light for output through the optical coupler 22 as the output wavelength of the laser transmitter 10.

The etalon 40 is, for example, a device capable of restricting the OPO linewidth to a small fraction of the crystals bandwidth, i.e. to below a wave number. Suitable etalons are known in the art that may be used for the purposes described herein.

The filter 45 between the non-linear optical crystals 34a and 34b is designed to reject light at a wavelength corresponding to the signal or idler wavelength (depending upon the configuration) produced by the non-linear optical crystals 34a and 34b. The filter 45 is an optional component, and in one embodiment is configured to reject light at the second (signal) wavelength. It is coated with a high damage threshold (tolerant) material. An example of such material is low absorption oxides capable of handling as much as 4 J/cm^2 of fluence.

The reflectivity and transmissivity of the various optical components of the OPO 30 are as follows. The pump mirror 36 has a high reflectivity (HR) at the pump (first) and the signal (second) wavelength and a high transmissivity (HT) at the idler (third) wavelength. The output coupler 22 is HR at the pump (first) and the signal (second) wavelength and HT at the idler (third) wavelength. The rear mirror 24 is HR at the idler (third) wavelength. The turning mirror 12C is HR at the pump (first) wavelength and HT at the signal (second) wavelength.

In operation, the pump laser 20 outputs a pump beam to the turning mirror 12A that directs the pump beam to turning mirror 12B and then through the isolator 14 and waveplate 15 to the turning mirror 12C, and then to the pump mirror 36. The pump beam has a particular polarization, e.g., a vertical polarization, and the isolator 14 rotates it by a predetermined amount, e.g., 45 degrees. The waveplate 15 sets up the desired polarization of the output light required by the laser transmitter 10 and so that the light that passes through the waveplate 15 reflects off the pump mirror 36 in the OPO 30 with the desired polarization.

The pump beam then passes through the non-linear optical crystals 34a and 34b where the signal and idler wavelengths of light are created. The optical coupler 22 reflects light at the pump beam wavelength back through the non-linear optical crystals 34b and 34a where it is again reflected by the pump mirror 36 to the turning mirror 12C, back through the isolator 14 and then into the optical dump element 38. The isolator 14 prevents the pump beam reflected back upstream by the turning mirror 12C from going into the pump laser 20. That is, when the pump beam goes back into the isolator 14 from the turning mirror 12C, the isolator rotates another 45 degrees such that it the pump beam that passes from right to left (as shown in FIG. 1) through the isolator is polarized by 90 degrees with respect to the polarization of the input pump beam, and is directed to the optical dump element 38.

The tuning equation that describes the non-linear operations of the OPO 10 is:

$$1/\lambda_{pump} = 1/\lambda_{signal} + 1/\lambda_{idler}$$

If the pump laser supplies a pump beam at a (first) wavelength of 1.064 microns, and the crystals 34a and 34b are tuned to some arbitrary wavelength in for the signal (second) wavelength, e.g., 1550 nm, the output light of the OPO 10 at the idler (third) wavelength would be approximately 3.4 microns. The non-linear crystals 34a and 34b are rotated and the etalon 40 adjusted to convert the pump beam into the two longer wavelengths, the signal and idler wavelengths. In one example, the crystals 34a and 34b are rotated and the etalon 40 is adjusted to achieve a beam of light at a desired wavelength that corresponds to the idler wavelength and light at the signal wavelength is dumped.

The following is a description of one example of an operation mode of the OPO 30 of the laser transmitter 10, where light at both the signal wavelength and the idler wavelength are not permitted to complete a complete "round-trip" in the OPO 30. Due to the fact that the pump mirror 36 and the output coupler 22 are HR at the signal wavelength, light at the signal wavelength created by the pump beam passing through the crystals 34a and 34b will be reflected by the optical coupler 22 back to the pump mirror 36 and out of the OPO 30 to the optical dump element 39. Light at the signal wavelength does not pass through the non-linear crystals 34a and 34b again.

There is a build up occurring in the OPO 30 that involves a "handing-off" between an idler resonant and a signal resonant mechanism. As the pump beam from the pump laser 20 hits the crystals 34a and 34b, light at the signal and idler wavelengths is generated at the first pass through the crystals 34a and 34b, picks up some gain, hits the optical coupler 22 and goes back through the crystals 34b and 34a to the pump mirror 36, causing light at the signal wavelength to be dumped. Light generated at the idler wavelength, on the other hand, is allowed to pass through the optical coupler 22 at out of the cavity as the desired output. But as light at the signal wavelength is reflected back by the optical coupler 22 and passes through the crystals 34b and 34a it will continue to generate light at the idler wavelength. That light at the idler wavelength continues through the pump mirror 36 through the etalon 40 and is reflected back by the rear mirror 24 through the etalon 40 and through the pump mirror 34, where it again passed through the crystals 34a and 34b, and ultimately out through the optical coupler 22. Light at the pump wavelength is still passing (in either direction) through crystals 34a and 34b in the cavity 30 so it can continue to convert more light at the idler wavelength and signal wavelength. The arrows inside the circle shown at 41 indicate that each time light at the idler wavelength passes through the etalon 40 (in both directions), the etalon 40 further narrows the light, making for a more precise control of the output light beam at the idler wavelength.

Thus, light at the signal wavelength is making a "U"-shaped loop against the right side of the OPO 30 and light at the idler wavelength is making a "U"-shaped loop against the left side of the OPO 30. Therefore, light at the signal wavelength and idler wavelength is not allowed to fully resonate within the cavity. Light at the idler wavelength is allowed to pass out of the OPO 30 as the output light beam to the right (in FIG. 1.) and light at the signal wavelength passes out of the OPO 30 by the pump mirror 36. Said another way, the optical coupler 22 and the pump mirror 36 cause light at the second wavelength to partially resonate in the OPO 30 before the pump mirror 36 reflects the light at the second wavelength out of the OPO 30 to the dump element 39. Similarly, optical coupler 22 and the rear mirror 24 cause light at the third wavelength to partially resonate in the OPO 30 before the optical coupler 22 allows light at the third wavelength to pass out of the OPO 30 as the output beam.

The pump beam is relatively high intensity and light at the signal wavelength is medium to high intensity. However, light at the idler wavelength is lower intensity because it is longer in wavelength (three times less than the pump for the example given above). Consequently, the optical elements (rear mirror 24 and etalon 40) at the left-hand side of the OPO 30 can be lower power rated optics.

Figure 2:
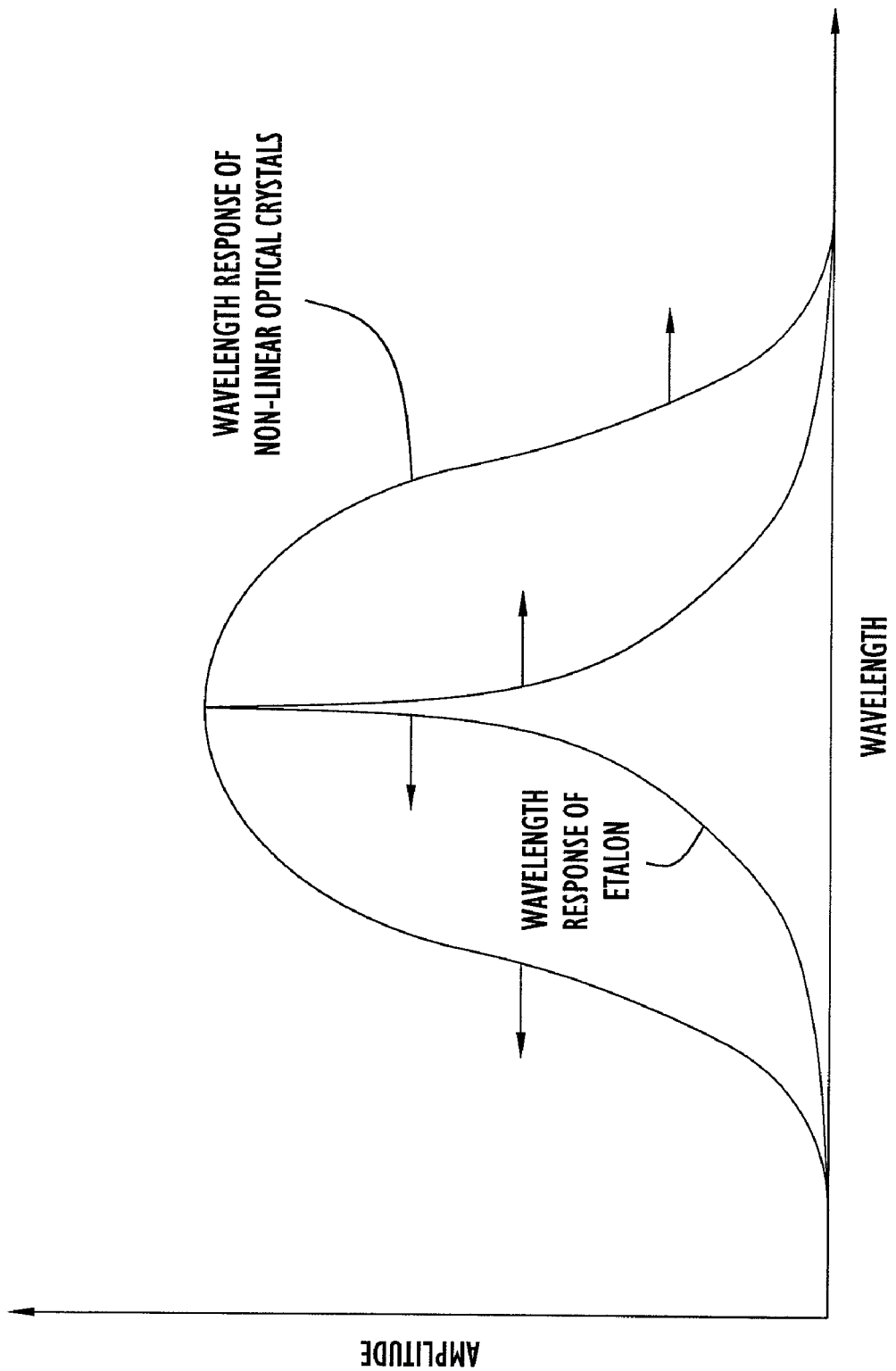
FIG. 2 is a plot showing the wavelength responses of non-linear optical crystals and a narrow wavelength filter in the optical parametric oscillator.

Turning to FIG. 2, the relative wavelength responses of the non-linear optical crystals 34a and 34b and of the etalon 40 are shown. The wavelength response of the non-linear optical crystals 34a and 34b can be adjusted or tuned to higher or lower wavelengths, but its linewidth is relatively the same. The wavelength position of the selected linewidth of the etalon 40 is adjustable to higher or lower wavelengths. Thus, the non-linear optical crystals 34a and 34b act as a coarse optical filter or wavelength selector and the etalon 40 serves as a very fine wavelength selection filter. For example, the linewidth of the non-linear optical crystals 34a and 34b may be as much as 50 nm (e.g., from 3 to 3.5 microns), but the linewidth of the etalon 40 may produce a linewidth smaller than 1 nm. When tuning the OPO 30, the angles of both the etalon 40 and the non-linear optical crystals 34a and 34b are adjusted in concert.

The non-linear optical crystals 34a and 34b can be formed of any crystalline material capable of producing parametric output, including, but not limited to: potassium tetanal phosphate (KTP), potassium tetanal arsenate (KTA), lithium niobate (LiNbO3), periodically poled lithium niobate (PPLN), potassium niobate (KNbO3), silver gallium selenite (AgGaSe2), and silver gallium sulfide (AgGaS2). For example, the OPO may have a tuning range from 3.15 microns to 3.65 microns using PPLN crystals with a period spacing of 28.8 microns at 28 degrees Celsius. Similarly, a PPLN crystal with a period spacing of 29.6 microns would yield a tuning range of approximately 3.1 to 3.6 microns. Depending on the type of non-linear crystal material and the cut of the crystal, a small angular deviation in the signal and idler beams with respect to the propagation axis may occur. However, using two counter rotating crystals mitigates this effect.

Figure 3:
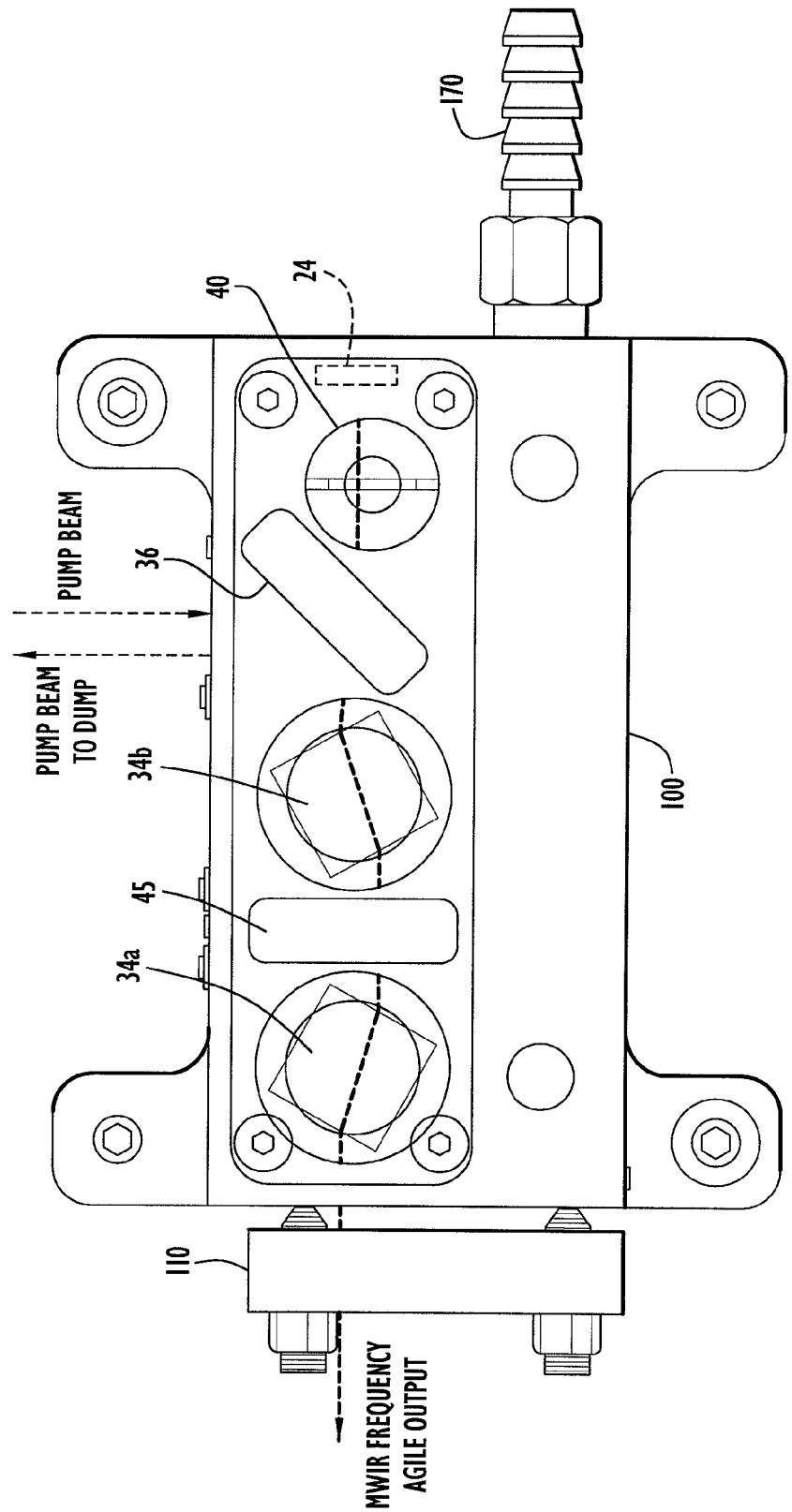
FIG. 3 is a top view showing the physical arrangement of the components of the optical parametric oscillator in a housing.
Figure 4:
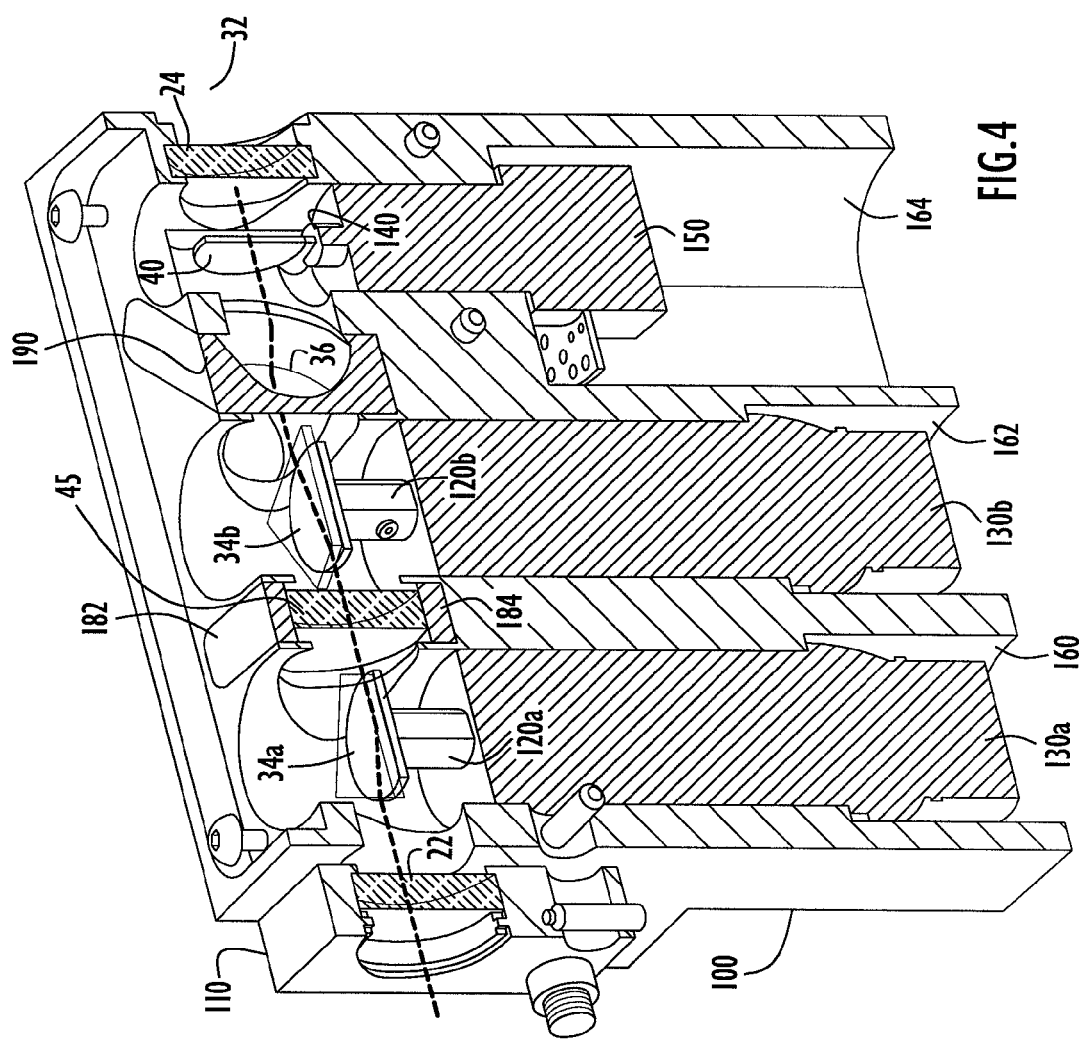
FIG. 4 is an internal view of the optical parametric oscillator, and showing the adjustable angles of the non-linear optical crystals and of the narrow bandwidth filter for tuning the output wavelength of the oscillator.

Turning to FIGS. 3 and 4, the OPO 30 may be embodied as a relatively small and compact device. A housing 100 made of material such as stainless steel contains the OPO components. The output coupler 22 may be disposed within its own housing 110 separate from the main housing 100 to provide degrees of freedom for alignment. The non-linear optical crystals 34a and 34b are mounted on top of shafts 120a and 120b that are a part of the respective galvanometers 130a and 130b. In addition, the etalon 40 is mounted to a shaft 140 that is attached to a galvanometer 150. The galvanometers 130a, 130b and 150 are controllable together to rotate their respective crystals 34a, 34b and etalon 40 with respect to the propagation axis of the OPO 30, thereby changing (tuning or adjusting) the wavelength location of the signal and idler wavelength beams produced by the crystals 34a and 34b, and the linewidth selection location of the etalon 40 to achieve the desired wavelength tuning. A control unit (not shown but known in the art) generates galvanometer control signals to adjust the angles of the first and second non-linear optical crystals 34a and 34b and the etalon 40 and can facilitate tuning at rates up to 2 kHz for small step wavelength changes on the order of 10-20 nm.

The galvanometers 130a and 130b for the non-linear optical crystals may be, for example, Cambridge Technology, Inc., Model 6220 galvanometers, and the galvanometer 150 for the etalon may be a Cambridge Technology Model 6215 galvanometer. The galvanometers 130a, 130b and 150 are housed inside individual chambers 160, 162 and 164, respectively. The galvanometers are programmable for each of a plurality of angles, where each angle is represented by a unique control voltage. Higher powered galvanometers may also be used that employ digital control feedback to achieve greater improvement and stability, particularly at high repetition rates. In addition, the temperature of the galvanometers is regulated by a liquid-cooled arrangement, whereby temperature-controlled water is supplied through a fitting 170 on the housing 100.

The filter 45 is held in position between the non-linear optical crystals 34a and 34b with filter mounts 182 and 184 attached to opposite ends of the filter 45. Similarly, the mirror 36 is held in position by a mount 190 that encircles the mirror

36 and is oriented at an angle with respect to the propagation axis. Finally, t FIG. 3 shows that the housing 100 allows for very close coupling of the optical components and provides cooling in a "mono-block" assembly. Lengthening the cavity would be detrimental in the overall performance of the OPO 30.

The wavelength tunable OPO 30 described herein may be used for a variety of applications. For example, it is useful as a multiple wavelength infrared source for detection of chemical/bio gases using Differential Absorption Lidar (DIAL) detection techniques, Differential Scattering (DISC) bioaerosol lidar, explosive gas detection (leaks or exploration) of natural gas, methamphetamine lab detection and toxic industrial chemical detection.

A method for wavelength-agile laser light beam generation is also provided, comprising: introducing a pump laser light beam at a first wavelength into an optical cavity bounded by first and second optical elements positioned at opposite ends of the optical cavity; passing the pump energy through a non-linear optical medium disposed within the optical cavity to convert the pump energy into energy at a second wavelength and a third wavelength each of which is longer than the first wavelength; adjusting an angle of the non-linear optical medium relative to a propagation axis to control the apportionment of energy between the second and third wavelengths; reflecting light at the first and second wavelengths by the first optical element so that it passes back through the non-linear optical medium towards the second optical element; reflecting light at the first wavelength out of the optical cavity after it has been reflected back through the non-linear optical medium; directing light at the third wavelength through a narrow linewidth filter and to the second optical element; and reflecting light at the third wavelength by the second optical element back through the narrow linewidth filter, through the non-linear optical medium and out through the first optical element as an output beam.

The apparatus and method described herein may be embodied in other specific forms without departing from the spirit or essential characteristics thereof. The foregoing embodiments are therefore to be considered in all respects illustrative and not meant to be limiting.

What is claimed is:

1. A wavelength-agile laser transmitter, comprising:
a pump laser that is configured to output a pump beam at a first wavelength; and
an optical parametric oscillator comprising:
a non-linear optical medium configured to convert light at the first wavelength to light at a second wavelength and a third wavelength that are each longer than the first wavelength, an angle of the non-linear optical medium relative to a propagation axis of the optical parametric oscillator being adjustable to control apportionment of energy converted into light at the second and third wavelengths;
a first optical element that is configured to receive the pump beam and direct it into a first end of the non-linear optical medium, wherein the first optical element is configured to be highly reflective at the second wavelength and highly transmissive at the third wavelength;
a second optical element positioned proximate a second end of the non-linear optical medium, wherein the second optical element is configured to be highly reflective at the first and second wavelengths and highly transmissive at the third wavelength;
an etalon positioned in proximate the first optical element, wherein the etalon is configured to narrow a linewidth of light that passes through it; and
a third optical element that is positioned proximate the etalon and which is configured to be highly reflective at the third wavelength such that light at the third wavelength resonates between the etalon and the third optical element and passes through the first optical element into the non-linear optical medium where it interacts with light at the second wavelength;
wherein an output beam corresponds to light that is transmitted through the second optical element at the third wavelength.

2. The laser transmitter of claim 1, wherein the first optical element and the second optical element cause light at the second wavelength to partially resonate in the optical parametric oscillator before the first optical element reflects the light at the second wavelength out of the optical parameter oscillator, and wherein the second optical element and the third optical element cause light at the third wavelength to partially resonate in the optical parametric oscillator before the second optical element allows light at the third wavelength to pass out of the optical parametric oscillator as the output beam.

3. The laser transmitter of claim 1, wherein said non-linear optical medium comprises first and second non-linear optical crystals, each of the first and second non-linear optical crystals configured to convert light at said first wavelength into light at said second wavelength and said third wavelength, wherein an angle of each of the first and second non-linear optical crystals relative to the propagation axis of the optical parametric oscillator is adjustable to control apportionment of energy between the second and third wavelengths that each of the first and second non-linear optical crystals produces.

4. The laser transmitter of claim 3, wherein the optical parametric oscillator comprises a filter positioned between the first and second non-linear optical crystals, wherein the filter is configured to substantially reject light at said second wavelength.

5. The laser transmitter of claim 3 wherein the first and second non-linear optical crystals are periodically poled lithium niobate (PPLN) crystals.

6. The laser transmitter of claim 3, and further comprising first and second galvanometers coupled to the first and second non-linear optical crystals, respectively, and being configured to adjust the angle of the first and second non-linear optical crystals, respectively, relative to the propagation axis of the optical parametric oscillator.

7. The laser transmitter of claim 3, wherein the first and second galvanometers are liquid-cooled.

8. The laser transmitter of claim 3, and further comprising a housing that contains the optical parametric oscillator.

9. The laser transmitter of claim 8, and wherein said housing comprises first, second and third chambers, said first and second chambers configured to contain the galvanometers for the first and second non-linear optical crystals, respectively.

10. The laser transmitter of claim 9, and further comprising a third galvanometer coupled to the etalon to adjust the position of the etalon in order to adjust the linewidth selection, and wherein the housing further comprises a third chamber configured to contain the third galvanometer.

11. The laser transmitter of claim 10, and further comprising a first arm that attaches the first non-linear optical crystal to first galvanometer, a second arm that attaches the second non-linear optical crystal to the second galvanometer, and a third arm that attaches the etalon to the third galvanometer, wherein the first, second and third galvanometers rotate the first, second and third arm, respectively, in order to change the angle of first and second non-linear optical crystals and the etalon, respectively, relative to the propagation axis of the optical parametric oscillator.

12. The laser transmitter of claim 6, wherein the first and second galvanometers for the first and second non-linear optical crystals are configured to be adjusted together.

13. The laser transmitter of claim 1, wherein the angle of the non-linear optical medium and the angle of the etalon are configured to adjust the third wavelength of light within a range of up to 500 nm.

14. A wavelength-agile laser transmitter apparatus, comprising:
a pump laser that is configured to output a pump beam at a first wavelength; and
a cavity that serves as an optical parametric oscillator, the cavity containing:
a non-linear optical medium configured to convert light at the first wavelength to light at a second wavelength and a third wavelength that are each longer than the first wavelength, an angle of the non-linear optical medium relative to a propagation axis of the optical parametric oscillator being adjustable to control apportionment of energy converted into light at the second and third wavelengths;
a first optical element that is configured to receive the pump beam and direct it into a first end of the non-linear optical medium, wherein the first optical element is configured to be highly reflective at the second wavelength and highly transmissive at the third wavelength;
a second optical element positioned proximate a second end of the non-linear optical medium, wherein the second optical element is configured to be highly reflective at the first and second wavelengths and highly transmissive at the third wavelength;
a narrow linewidth filter positioned proximate the first optical element and configured to narrow a linewidth of light that passes through it; and
a third optical element that is positioned proximate the narrow linewidth filter and which is configured to be highly reflective at the third wavelength such that light at the third wavelength resonates between the narrow linewidth filter and the third optical element and passes through the first optical element into the non-linear optical medium where it interacts with light at the second wavelength;
wherein the first optical element and the second optical element cause light at the second wavelength to partially resonate in the optical parametric oscillator before the first optical element reflects the light at the second wavelength out of the optical parameter oscillator, and wherein the second optical element and the third optical element cause light at the third wavelength to partially resonate in the optical parametric oscillator before the second optical element allows light at the third wavelength to pass out of the optical parametric oscillator as an output beam.

15. The apparatus of claim 14, wherein said non-linear optical medium comprises first and second non-linear optical crystals, each of the first and second non-linear optical crystals configured to convert light at said first wavelength into light at said second wavelength and said third wavelength, wherein an angle of each of the first and second non-linear optical crystals relative to the propagation axis of the optical parametric oscillator is adjustable to control apportionment of energy between the second and third wavelengths that each of the first and second non-linear optical crystals produces.

16. The apparatus of claim 15, wherein the narrow linewidth filter is adjustable to control linewidth filter selection of light passing therethrough.

17. The apparatus of claim 15, wherein the optical parametric oscillator comprises a filter positioned between the first and second non-linear optical crystals, wherein the filter is configured to substantially reject light at said second wavelength.

18. The apparatus of claim 15, wherein the first and second non-linear optical crystals are periodically poled lithium niobate (PPLN) crystals.

19. The apparatus of claim 15, and further comprising first and second galvanometers coupled to the first and second non-linear optical crystals, respectively, and being configured to adjust the angle of the first and second non-linear optical crystals, respectively, relative to the propagation axis of the optical parametric oscillator.

20. A wavelength-agile laser transmitter apparatus, comprising:
means for outputting a pump light beam at a first wavelength; and
means for containing a plurality of optical elements to support optical parametric oscillation therein, including:
means for converting light at the first wavelength to light at a second wavelength and a third wavelength that are each longer than the first wavelength, wherein said means for converting being adjustable to control apportionment of energy converted into light at the second and third wavelengths;
first optical means for receiving the pump beam and directing it into a first end of the means for converting and configured for being be highly reflective at the second wavelength and highly transmissive at the third wavelength;
second optical means positioned proximate a second end of the means for converting and configured for being highly reflective at the first and second wavelengths and highly transmissive at the third wavelength;
filtering means positioned proximate the first optical means and configured for narrowing a linewidth of light that passes through it; and
a third optical means positioned proximate the filtering means and configured for being highly reflective at the third wavelength such that light at the third wavelength resonates between the filtering means and the third optical means and passes through the first optical means into the means for converting where it interacts with light at the second wavelength;
wherein the first optical means and the second optical means cause light at the second wavelength to partially resonate in the means for containing before the first optical means reflects the light at the second wavelength out of the means for containing, and wherein the second optical means and the third optical means cause light at the third wavelength to partially resonate in the means for containing before the second optical means allows light at the third wavelength to pass out of the means for containing as an output beam.

21. A method comprising:
introducing a pump laser light beam at a first wavelength into an optical cavity bounded by first and second optical elements positioned at opposite ends of the optical cavity;

passing the pump energy through a non-linear optical medium disposed within the optical cavity to convert the pump energy into energy at a second wavelength and a third wavelength each of which is longer than the first wavelength;

adjusting an angle of the non-linear optical medium relative to a propagation axis to control the apportionment of energy between the second and third wavelengths;

reflecting light at the first and second wavelengths by the first optical element so that it passes back through the non-linear optical medium towards the second optical element;

reflecting light at the first wavelength out of the optical cavity after it has been reflected back through the non-linear optical medium;

directing light at the third wavelength through a narrow linewidth filter and to the second optical element; and reflecting light at the third wavelength by the second optical element back through the narrow linewidth filter, through the non-linear optical medium and out through the first optical element as an output beam.

22. The method of claim 21, and further comprising reflecting light at the second wavelength out of the cavity after it has partially resonated in the cavity.

23. The method of claim 22, wherein reflecting light at the second wavelength comprises reflecting light at the second wavelength after it has been reflected by the first optical element and has passed through the non-linear optical medium.

24. The method of claim 22, wherein reflecting light at the third wavelength comprises reflecting the light at the third wavelength after it has partially resonated in the cavity before it passes out cavity through the first optical element as the output beam.

25. The method of claim 21, and further comprising adjusting the narrow linewidth filter.

* * * * *